Figure 1:
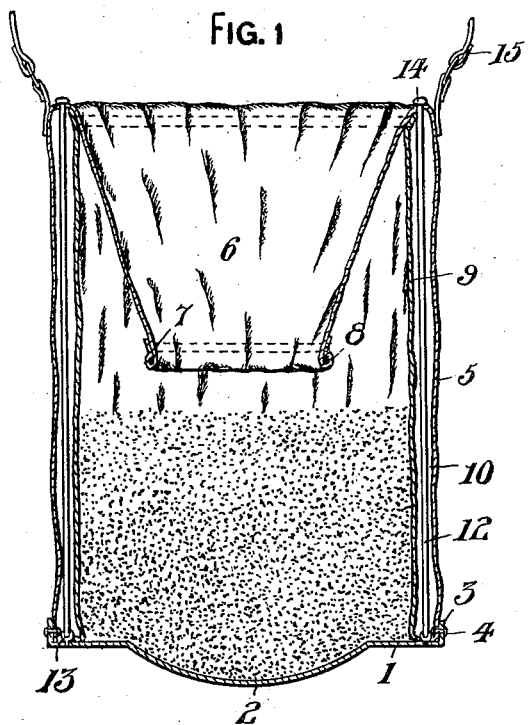

P. SZATHMÁRY.
FEED BAG.
APPLICATION FILED OCT. 14, 1911.

1,026,720.

Patented May 21, 1912.

WITNESSES

INVENTOR
P. Szathmáry
BY
ATTORNEYS

UNITED STATES PATENT OFFICE.

PAUL SZATHMÁRY, OF CLARENCE, NEW YORK.

FEED-BAG.

1,026,720.  Specification of Letters Patent.  Patented May 21, 1912.

Application filed October 14, 1911. Serial No. 654,627.

*To all whom it may concern:*

Be it known that I, PAUL SZATHMÁRY, a subject of the King of Hungary, residing at Clarence, in the county of Erie and State of New York, have invented certain new and useful Improvements in Feed-Bags, of which the following is a specification, reference being had therein to the accompanying drawing.

This invention relates to feed bags, and the objects of my invention are, first, to provide a feed receptacle with novel means for preventing feed from being spilled while the receptacle is in use; second, to furnish a feed bag with means for elevating the bottom thereof as the feed is consumed; third, to provide a feed bag that can be maintained in a sanitary condition, and fourth, to accomplish the above results by a mechanical construction that is inexpensive to manufacture, durable and highly efficient for the purposes for which it is intended.

With the above and other objects in view the invention resides in the novel construction to be hereinafter specifically described and then claimed.

Reference will now be had to the drawing wherein:—

Figure 2:
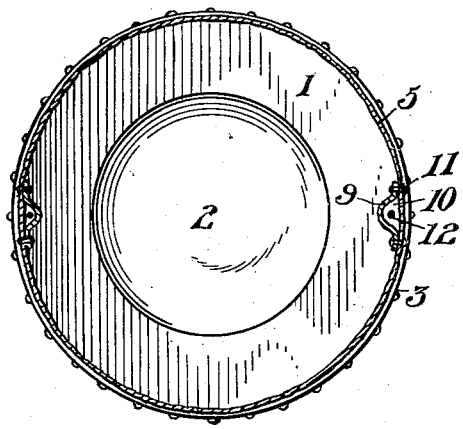

Figure 1 is a vertical sectional view of the feed bag, and Fig. 2 is a horizontal sectional view of the same.

A feed bag in accordance with this invention comprises a circular bottom plate 1 having a central circular depressed portion 2 and the peripheral edges of said bottom plate provided with an annular vertical flange 3. Riveted or otherwise connected, as at 4 to said flange is the lower end of a flexible cylindrical casing 5 having the upper end thereof gathered and folded inwardly to provide a funnel-shaped mouth piece 6 extending to a point approximately intermediate the ends of the feed bag. The funnel-shaped mouth piece 6 is provided with a case 7 for a ring 8 that maintains the opening at the lower end of the funnel-shaped mouth piece.

Inner oppositely disposed walls of the flexible casing 5 are provided with vertical pieces 9 providing vertical cases 10 extending from the bottom plate 1 to the upper end of the feed bag. The vertical pieces 9 are riveted or otherwise connected as at 11 to the casing 5. Arranged in the cases 10 are elastic cords 12 having the lower ends thereof connected to eyes 13, carried by the bottom plate 1 and the upper ends thereof knotted or provided with heads 14 for retaining said cords within the cases. Connected to the upper end of the feed bag, at diametrically opposed points are straps 15 of a conventional form, whereby the feed bag can be suspended from an animal's head. The elasticity of the cords 12 normally retain the fed bag in a collapsed position, but when feed or other matter is placed in the bag the cords are stretched or elongated as shown in Fig. 1. As the feed is consumed, the cords 12 contract in their longitudinal dimensions and elevate the bottom plate 1, whereby the entire contents of the bag can be consumed.

The funnel-shaped mouth piece 6 is of sufficient size to accommodate the nose of a horse and said mouth piece serves as a deflector for preventing feed or other matter from being wasted while the horse or other animal is feeding.

What I claim is:—

A feed bag comprising a circular bottom plate having an upwardly extending annular flange and a centrally disposed depressed concave portion, a flexible casing provided at its upper portion with an inwardly extending funnel-shaped mouthpiece, means for securing the casing to said flange, vertical strips attached at their lower ends to said bottom plate and at the upper ends to the upper portion of the casing and further secured at their side edges to the inner face of the casing, thereby providing cases, elastic cords arranged within the cases and having their lower ends connected to the bottom plate and their upper ends extending through the upper portion of said casing and the upper ends of said cords provided with heads and supporting straps attached to said casing.

In testimony whereof I affix my signature in the presence of two witnesses.

PAUL SZATHMÁRY.

Witnesses:
ANDREW KELEMÁNICS,
SOLTÉSZ PÉTER.

Copies of this patent may be obtained for five cents each, by addressing the "Commissioner of Patents, Washington, D. C."